United States Patent Office 3,699,087
Patented Oct. 17, 1972

3,699,087
HEAT TREATMENT OF AROMATIC SULFIDE POLYMERS
Harold V. Wood and Terry D. Brown, Bartlesville, Okla., assignors to Phillips Petroleum Company
No Drawing. Filed Mar. 11, 1971, Ser. No. 123,383
Int. Cl. C08g 23/00
U.S. Cl. 260—79
14 Claims

ABSTRACT OF THE DISCLOSURE

The melt flow of thermoplastic poly(arylene sulfide) resins can be decreased by heating at a temperature below the melting point of the polymer in the presence of certain melt flow modifiers, e.g., sulfur. Aromatic sulfide polymers treated in accordance with the invention retain their thermoplastic nature and can be used in a variety of industrial applications, e.g., as molding compositions.

---

This invention relates to aromatic sulfide polymers. More particularly, it relates to the treatment of a polymer from a reaction product of at least one polyhalo-substituted cyclic compound with an alkali metal sulfide in a reaction medium comprising a polar organic compound. More specifically, the invention relates to decreasing the melt flow of arylene sulfide polymers. Further, the invention relates to the production of a sulfur-containing polymer characterized by a low melt flow which can be molded and which possesses high temperature stability.

Aromatic sulfide polymers ranging in consistency from viscous liquids to crystalline solids are known. While such polymers exhibit desirable properties for many applications such as molding compositions, the unmodified polymers normally possess a relatively high melt flow, e.g., above 1000, which inhibits their use. For example, when exposed to process temperatures above their melt point, the unmodified polymers tend to substantially completely degrade or, at the least, require excessive processing times. Since the desirable properties make the polymers extremely useful, it would be advantageous to improve the processability of the solid polymers without materially affecting desirable properties.

It has now been found that an improved class of poly(arylene sulfides) can be obtained by heating the sulfur-containing polymer (prepared, for example, in the manner of Edmonds et al. U.S. Pat. 3,354,129) at a temperature below the melt point of the resin for a time sufficient to effect a reduction in the melt flow of of the resin in the presence of at least one melt flow modifier selected from the group consisting of elemental sulfur, one or more organic peroxides, or one or more thiuram polysulfides. The so-modified polymer is a stable resinous material which retains its original physical appearance, e.g., particulate shape, and remains sufficiently thermoplastic to form into shaped objects as by injection or compression molding, with substantially reduced processing times. The poly(arylene sulfide) materials which are modified according to the invention do not degrade materially at normal processing temperatures and exhibit improved processability at such temperatures.

It is to be understood that the properties of the polymeric material modified according to the invention vary considerably with the nature of the starting material, such as the molecular weight, melt viscosity and the like. The length of time and temperature of the heat treatment can also be used to vary the properties within wide limits, it being understood that even after the mildest treatment, some improvement in heat stability and processing capability is obtained.

It has now been discovered that the processing characteristics of poly(arylene sulfide) polymeric materials can be substantially improved by heat treating such polymers in the presence of certain melt flow modifiers to decrease their melt flow under conditions such that the polymers retain their original form and also retain their original thermoplastic nature. Thus, in accordance with the present invention, the melt flow of arylene sulfide polymers is decreased by contacting such polymers with a small amount of a melt flow modifier selected from the group consisting of sulfur, organic peroxides, or thiuram polysulfides at a temperature below the melting point of the normally solid polymer for a time sufficient to effect a substantial reduction in the melt flow of the polymeric material. According to the process of this invention, the melt flow of sulfur-containing polymeric products obtained by the reaction of polyhalo-substituted aromatic compounds or polyhalo-substituted heterocyclic compounds with an alkali metal sulfide in a polar organic solvent can be decreased by heating said polymeric products in the presence of a minor amount of sulfur, or at least one organic peroxide, or at least one thiuram polysulfide.

The polyhalo-substituted compounds which can be employed as primary reactants for the polymeric product are represented by the formulas:

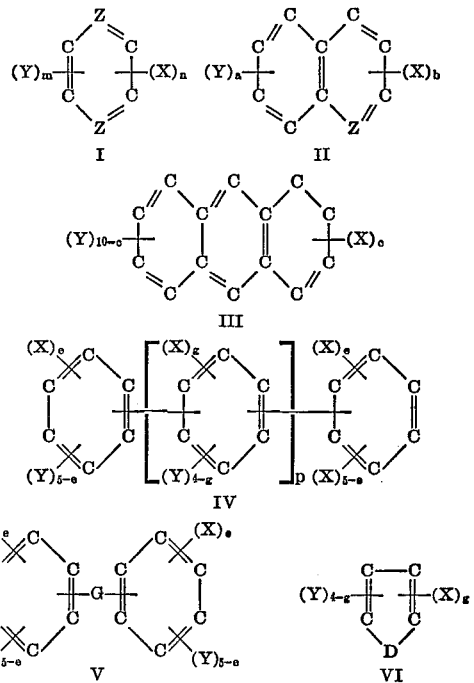

wherein each X is a halogen selected from the group consisting of chlorine, bromine, iodine, and fluorine, preferably chlorine and bromine, each Y is selected from the group consisting of hydrogen,

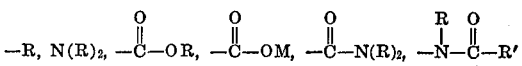

wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

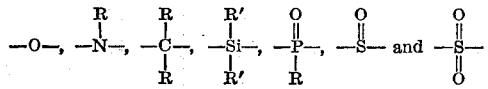

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z is Formula II is —C=, $a=8-b$, when Z in Formula II is —N=, $a=7-b$; $c$ is a whole integer from 2 to 10, inclusive, $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds, particularly dihalobenzenes and dihalobiphenyls.

Some specific examples of polyhalo-substituted aromatic compounds and polyhalo-substituted heterocyclic compounds of the above general formulas which are reacted with alkali metal sulfides to produce the polymeric products which are improved according to the process of this invention are:

1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4,5-tetrabromobenzene
hexachlorobenzene
1-n-butyl-2,5-dichlorobenzene
1-cyclohexyl-2,5-diiodobenzene
1-isooctyl-2,4-difluorobenzene
1-n-dodecyl-2,5-dichlorobenzene
1-benzyl-2,5-dibromobenzene
1,4-di-n-butyl-2,5-dichlorobenzene
1,4-di-n-nonyl-2,6-dibromobenzene
1,3,5-trichloro-2,4,6-triphenylbenzene
1,4-dibromo-2,3,5,6-tetra(4-ethylphenyl)benzene
methyl 2,5-dichlorobenzoate
isopropyl 2,3,5-tribromobenzoate
cyclohexyl 2,4,6-triiodobenzoate
phenyl 2,3,4,5,6-pentachlorobenzoate
2,5-dichlorobenzamide
N,N-di-n-dodecyl-2,4,5-tribromobenzamide
ethyl 2,4,5-trichloroacetanilide
cyclohexyl N-methyl-2,5-dibromoacetanilide
1,4-dibromonaphthalene
1,4-dichloro-7,8-diethylnaphthalene
1-methoxy-2,5-dichlorobenzene
1-cyclohexylthio-2,5-dichlorobenzene
1,4,7,8-tetrabromo-2,3,5,6-tetra-n-butylnaphthalene
1,3,5-trichloro-7-aminonaphthalene
n-octyl 2,4-dibromonaphthalene-1-carboxylate
N,N-dimethyl-5,6,7,8-tetrabromo-1-naphthalene-carboxamide
1-acetamido-2,4-dibromonaphthalene
8-decoxyl-1,4-difluoronaphthalene
6,7-dibenzyl-8-methylthio-1,4-dichloronaphthalene
1,4-dichloroanthracene
1,7-dibromo-6-cyclohexylanthracene
2,8-diiodo-3,7-diethylanthracene
1-dodecyl-2,6-difluoroanthracene
1,2,4-trichloro-6-carbethoxyanthracene
2,6-dibromo-8-aminoanthracene
3,7-diiodo-4-cyclohexylthioanthracene
n-decyl 3,8-difluoroanthracene carboxylate
1-acetamido-2,4-dibromoanthracene
10-dodecoxy-1,3,5-trichloroanthracene
4,4'-dichlorobiphenyl
3,4'-dibromo-2-aminobiphenyl
2,2',4-tribromo-6-acetamidobiphenyl
3,3'-dichloro-4,4'-didodecylbiphenyl
4,4'-diiodo-3-ethoxy-6-n-octylbiphenyl
2,2',4,4'-tetrabromo-6-N,N-dimethylaminobiphenyl
4,4'-dichloro-3,3'-dicyclohexylbiphenyl
4,4''-dibromo-p-terphenyl
3,3',3''-trichloro-p-terphenyl
4,4''-dichloro-3'-acetamido-p-terphenyl
4,4''-difluoro-2,2',2''-tri-n-decyl-3'-methoxy-p-terphenyl
4,4''-dibromo-3'-carbbutoxy-p-terphenyl
4,4''-dichloro-2-(N-acetylamino)-p-terphenyl
3,4-dibromothiophene
3,4-dichlorofuran
3,4-difluoropyrrole
2,5-dibromo-4-aminothiophene
2,5-dichloro-3-ethoxythiophene
3,4-difluoro-5-acetamidofuran
3,4-dibromo-5-carbethoxypyrrole
2,5-dichloropyridine
3,5-dibromo-4-methylpyridine
4,8-diiodoquinoline
2,3,6,7-tetrachloro-4,5-di-n-butylquinoline
1,4-dibromo-2,3,5,6-tetrafluorobenzene
4-chlorobromobenzene
2,5-dichlorobenzene-sulfonic acid
sodium 2,5-dibromobenzenesulfonate
2,8-difluoronaphthalenecarboxylic acid
lithium 2,7-diiodoanthracenecarboxylate
p,p'-dichlorodiphenyl ether
o,p'-dibromodiphenylamine
2,4'-difluorodiphenylmethane
3,3'-dichlorodiphenyl dimethylsilane
di(2-methyl-4-bromophenyl) sulfoxide
methyl di(3-ethyl-4-chlorophenyl) phosphite
4-bromophenyl 3-n-butyl-4-chlorophenyl sulfone
2,6-dichloropyrazine.

It is to be understood that the polymeric reactants according to the invention are intended to include homopolymers obtained by the reaction of one of the above-described compounds with an alkali metal sulfide as well as copolymers and/or terpolymers, etc., obtained when mixtures of two or more of the above compounds are reacted with an alkali metal sulfide.

The alkali metal sulfides which are reacted with the above-described compounds to form a reactant of the process are represented by the formula $M_2S$ (M as defined above), and include monosulfides of sodium, potassium, lithium, rubidium, and cesium, including the anhydrous and hydrated forms of these sulfides. These alkali metal sulfides can be charged per se, or they can be formed in situ by reaction of an alkali metal hydroxide with $H_2S$ at a mol ratio of alkali metal hydroxide/$H_2S$ of about 2/1.

Polar organic compounds which are employed in the reaction to make the polymeric reactants of the invention should be a solvent for the polyhalo-substituted aromatic compounds or polyhalo-substituted heterocyclic compounds and the alkali metal sulfide. Examples of suitable solvents include amides, lactams, sulfones and the like. Specific examples of such compounds are N-methylpyrrolidone, pyrrolidone, caprolactam, N-ethylcaprolactam, sulfolane, dimethylacetamide, hexamethylphosphoramide, tetramethylurea, N,N'-ethylene dipyrrolidone, and dimethyl formamide.

The melt flow modifiers which are used in the practice of the invention are selected from the class consisting of elemental sulfur, thiuram polysulfides and organic peroxides. When using a modifier other than sulfur, more than one of the particular class of modifiers can be employed, e.g., mixtures of two or more thiuram polysulfides or mixtures of two or more organic peroxides may be employed in the process of this invention. However, it has been found that the separate classes should not be admixed, e.g., sulfur should not be combined with a thiuram polysulfide or organic peroxide nor should a thiuram polysulfide be admixed with either sulfur or an organic peroxide.

The thiuram polysulfides that can be employed to decrease the melt flow of arylene sulfide polymers in accordance with the invention are selected from the group having the formula

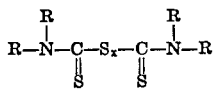

wherein $x$ is 2, 3, or 4; R is selected from the group consisting of alkyl or cycloalkyl radicals containing up to and including 10 carbon atoms, and the R groups attached to a terminal nitrogen atom can be joined to form with said nitrogen atom a heterocyclic structure. Examples of such compounds are tetramethylthiuram-disulfide,
tetraethylthiuram-trisulfide,
tetraamylthiuram-tetrasulfide,
tetradecylthiuram-disulfide,
tetraoctylthiuram-disulfide,
tetracyclohexylthiuram-trisulfide,
dipentamethylenethiuram-tetrasulfide, and the like.

The organic peroxides that can be used as melt flow modifiers according to the practice of this invention to decrease the melt flow of arylene sulfide polymers are selected from the group consisting of aliphatic, cycloaliphatic and aromatic peroxides, diacylperoxides, ketone peroxides, peroxy esters, hydroperoxides, peroxy dicarbonates, and the like. Exemplary of such compounds are t-butyl cumyl peroxide,
di-t-butyl peroxide,
t-butyl peroxybenzoate,
2,5-dimethyl-2,5-bis(t-butyl peroxy)hexane,
2,5-dimethyl-2,5-bis(t-butyl peroxy)-3-hexyne,
n-butyl-4,4-bis(t-butyl peroxy)valerate,
dicumyl peroxide,
1,4-bis[2-(t-butyl peroxy)-2-propyl]benzene,
1,1-di(t-butyl peroxy)-3,3,5-trimethylcyclohexane,
dibenzoyl peroxide,
bis-(2,4-dichlorobenzyl) peroxide,
bis-(p-chlorobenzoyl) peroxide, etc. A more extensive list of organic peroxides which can be used in the practice of the invention is found in Encyclopedia of Polymer Science and Technology, Magelli et al., "Peroxy Compounds," Interscience Publishers, New York (1968), vol. 9, pp. 814 et seq.

The process of the invention is carried out by forming a homogeneous dispersion of at least one of the above-defined polymeric products and a finely divided melt flow modifier such as sulfur, tetramethylthiuram-disulfide or dicumyl peroxide. Formation of the dispersion can be carried out in any suitable manner, including dry mixing, grinding the ingredients together, or mixing in the presence of a dispersing medium. When employing a dispersing medium, the slurry of polymer and melt flow modifier in a dispersing medium is agitated to form a homogeneous mixture in a manner so as to minimize evaporation of the dispersing medium during mixing. Formation of the mixture and subsequent separation of the dispersing agent, if used, is normally carried out at temperatures below the melting point of the melt flow modifier. Following formation of the mixture, the dispersing medium, if used, can be separated by such methods as filtration, decantation, evaporation and the like.

Exemplary dispersing media include methanol, ethanol, isopropanol, water, hydrocarbons such as benzene, toluene, cyclohexane, normal heptane, and the like, including mixtures of two or more of such solvents.

In the process of this invention, it is critical that the mixture be heated to a temperature which is below the melting point of the chosen polymeric product. The melt point of arylene sulfide polymers can be readily determined by differential thermal analysis (DTA) by heating a 10 mg. sample of the polymer at a rate of 10° C. per minute. The melt point is taken from the DTA thermogram in a conventional manner. This temperature will vary from the range of about 200° F. to about 850° F., depending upon the molecular weight of the polymeric product being treated in accordance with the invention. Generally, the treatment temperature will be in the range of from about 25° F. to 100° F., preferably 40° F. to 90° F. below the melt point of the polymer being treated. The time during which the mixture is held at such a temperature will range from a few minutes to several days, usually from about 1 to 24 hours with the longer times being used at lower temperatures, and vice versa. The preferred time for a poly(phenylene sulfide), for example, is 3 hours to 6 hours in a temperature range of 40° F. to 90° F. below the melt point of the polymer.

The amount of melt flow modifier present in the mixture of modifier and polymer according to the invention will be generally in the range of from about 2 parts to about 10 parts of modifier per 100 parts of polymer. The amount of modifier used will depend mainly upon the chosen polymeric product and the decrease in melt flow desired, and upon other variables selected by one skilled in the art. Particularly beneficial decreases in melt flow have been obtained with about 5 parts of modifier per 100 parts of polymer.

In another embodiment of the invention, a molded product can be made directly by heating a homogeneous mixture of a polymer and melt flow modifier in a mold which has the shape of the desired product. This method is useful when the desired product is of such high molecular weight that it is difficult to melt.

The polymers of reduced melt flow produced by the process of this invention can be molded into a variety of useful articles by molding techniques which are well known in the art. Molding should be carried out above the melting point or the softening point, but below the decomposition point of a particular polymer being molded. Suitable molding techniques include injection molding, compression molding, vacuum forming, extrusion and the like. Non-meltable polymers can be fabricated by means of a binder or by a sintering technique using powder molding as is used in powder metallurgy.

The polymers of this invention have utility in any use wherein high melting point and/or high temperature stability is desired. These polymers can be blended with fillers, pigments, stabilizers, softeners, extenders and other polymers. Such fillers are graphite, carbon black, titania, glass fibers, metal powders, magnesia, asbestos, clays, wood flour, cotton floc, alpha-cellulose, mica and the like can be employed. A more complete list of fillers is disclosed in Modern Plastics Encyclopedia, 41, No. 1a, September 1963, pp. 529–536.

The following examples are intended to illustrate the process of this invention.

EXAMPLE I

A homogeneous dispersion of 94 parts by weight of powdered poly(phenylene sulfide) having a melting point of 550° F. and prepared by the reaction of sodium sulfide with p-dichlorobenzene in N-methylpyrrolidone, and 6 parts by weight of finely divided sulfur was prepared by dry blending in a Waring Blendor. This homogeneous dispersion was divided into two equal parts. One part was heated in the muffle furnace at atmospheric pressure for 3 hours at 700° F. The homogeneous mixture of poly(phenylene sulfide) and sulfur was fused to a brittle solid. The other part was heated in a muffle furnace at atmospheric pressure for 3 hours at 500° F. The homogeneous mixture of poly(phenylene sulfide) and sulfur was recovered as a free-flowing powder of polymer particles coated with sulfur. One hundred parts by weight of the same batch of poly(phenylene sulfide) without the addition of sulfur was heated in the muffle furnace at atmospheric pressure for 3 hours at 500° F. The poly(phenylene sulfide) retained its original particulate form.

Each of these samples was injection molded using a Mini-Injector at 650° F. and 90 p.s.i.g. for 3 minutes to form a 6 in. x ½ in. x ⅛ in. specimen. The physical properties of these specimens are reported in Table I below.

each instance, the poly(phenylene sulfide) retained its original powder form.

Following the curing of each sample, the melt flow at 650° F. was determined by measuring the amount of polymer extruded at 650° F. through an orifice having a diameter of 0.0843 inch with 5,000 grams weight on the polymer in order to evaluate the effect of the treatment accorded each sample upon the polymer. The results are reported in the following Table II.

TABLE II

| PPS, M.P. 550° F. | Tetramethylthiuram disulfide | Curing Temperature, °F. | Time, hrs. | Melt flow at 650° F., g./10 min. |
|---|---|---|---|---|
| 100 | | 500 | 1 | 1,119.1 |
| 94 | 6 | 500 | 1 | 689.0 |
| 100 | | 500 | 2 | 891.4 |
| 94 | 6 | 500 | 2 | 511.1 |
| 100 | | 500 | 3 | 648.6 |
| 94 | 6 | 500 | 3 | 170.6 |

TABLE I

| PPS, M.P. 550° F. | Sulfur | Curing Temperature, °F. | Time, hrs. | Melt flow at 650° F., g./10 min. | Flexural modulus, ×10³ | Tensile strength, p.s.i. | Elongation, percent | Izod impact [1] |
|---|---|---|---|---|---|---|---|---|
| 100 | 0 | 500 | 3 | 648.6 | 514 | 1,030 | 1 | 0.16 |
| 94 | 6 | 500 | 3 | 67.0 | 365 | 1,570 | 1 | 0.71 |
| 94 | 6 | 700 | 3 | | 419 | [2] Brittle | | 0.36 |

[1] Unnotched specimens.
[2] Specimen too brittle to measure. Specimen broke in test machine.

It can be seen from the foregoing example that the melt flow was significantly decreased by the addition of a small amount of sulfur to a poly(phenylene sulfide) polymer. It will be noted that the poly(phenylene sulfide) polymer which was heated together with sulfur at a temperature below the melt point of the polymer resulted in a polymeric product having improved processing characteristics, e.g., the treated polymer retained its original particulate form, in comparison to a poly(phenylene sulfide) polymer heated together with sulfur at a temperature above the melt point of the polymer, e.g., such treatment fused the polymer particles to a brittle solid.

EXAMPLE II

A series of runs was carried out in which poly(phenylene sulfide) having a melting point of 525° F. and prepared by the reaction of sodium sulfide with p-dichlorobenzene in N-methylpyrrolidone, was heated with tetramethylthiuram disulfide according to the process of this invention.

In these runs, 94 parts by weight of the poly(phenylene sulfide) and 6 parts by weight of tetramethylthiuram disulfide was dry blended in a Waring Blendor to form a homogeneous dispersion. This homogeneous dispersion was divided into three equal parts. One part was heated in the muffle furnace at atmospheric pressure for one hour at 500° F., a second part was heated in a muffle furnace at atmospheric pressure for two hours at 500° F., and a third part was heated in a muffle furnace at atmospheric pressure for three hours at 500° F. Samples of the same batch of poly(phenylene sulfide) without the addition of tetramethylthiuram disulfide was heated in the muffle furnace at atmospheric pressure at 500° F. for identical periods, i.e., 1 hour, 2 hours, and 3 hours. In It can be seen from the foregoing example that, while heating poly(phenylene sulfide) in the absence of any curing agent is effective in decreasing melt flow, heating poly(phenylene sulfide) in the presence of a small amount of tetramethylthiuram disulfide causes a greater decrease in melt flow. It is noted that the heating of poly(phenylene sulfide) polymer in the presence of tetramethylthiuram disulfide results in decrease in melt flow in a shorter period of time, thereby demonstrating improved processability of poly(phenylene sulfide) polymers when such polymers are treated in accordane with the invention.

EXAMPLE III

A series of runs was carried out in which poly(phenylene sulfide) having a melting point of 50° F. was prepared by the reaction of sodium sulfide with p-dichlorobenzene in N-methylpyrrolidone and was heated with various organic peroxides according to the process of this invention. Separate samples of the same polymer were heated in the absence of a curing agent. In these runs, homogeneous dispersion of powdered poly(phenylene sulfied) and an amount of organic peroxide ranging from 1 part by weight to 10 parts by weight prepared by dry blending in a Waring Blendor were divided into several aliquot portions. The aliquot portions were heated in a muffle furnace at atmospheric pressures for varying periods of time at 500° F. Separate samples of the same batch of poly(phenylene sulfide) without the addition of organic sulfide were heated in the muffle furnace at atmospheric pressure at 500° F. for the same curing periods. In each instance, the polymer retained its original powder form. The melt flow at 650° F. of each sample is reported in the following table. The results of these runs are reported in Table III.

TABLE III

| PPS, M.P. 550° F. | Parts by weight | | | | Cure temperature, °F. | Melt flow at 650° F. (g./10 min.) at cure time of— | | | |
|---|---|---|---|---|---|---|---|---|---|
| | Benzoyl peroxide | Dicumyl peroxide | Lauryl peroxide | Di-t-butyl peroxide | | 0 hr. | 1 hr. | 2 hrs. | 3 hrs. |
| 100 | 0 | 0 | 0 | 0 | N/A | 836.4 | | | |
| 100 | 0 | 0 | 0 | 0 | 500 | | 699.8 | 418.8 | 318.9 |
| 99 | 1 | 0 | 0 | 0 | 500 | | 657.0 | 334.3 | 66.3 |
| 99 | 0 | 1 | 0 | 0 | 500 | | 608.0 | 346.3 | 138.8 |
| 95 | 0 | 5 | 0 | 0 | 500 | | 101.1 | 7.2 | 5.8 |
| 90 | 0 | 10 | 0 | 0 | 500 | | 72.9 | | 10.3 |
| 99 | 0 | 0 | 1 | 0 | 500 | | 237.5 | 35.6 | 28.0 |
| 99 | 0 | 0 | 0 | 1 | 500 | | 360.9 | 290.2 | 197.4 |

The foregoing example demonstrates the efficacy of organic peroxide compounds in effecting a decrease in melt flow of arylene sulfide polymers.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A method for decreasing the melt flow of a sulfur-containing polymer which comprises admixing
    (1) a polymer produced by the reaction of at least one polyhalosubstituted cyclic compound containing unsaturation between adjacent ring carbons and wherein the halogen atoms are attached to ring carbon atoms with an alkali metal sulfide and a polar organic solvent at an elevated temperature for a time sufficient to obtain said polymer; with
    (2) an amount sufficient to reduce the melt flow of such polymer of a melt flow modifier selected from the group consisting of sulfur, thiuram polysulfides, or organic peroxides; and
    heating said admixture at a temperature of at least 25° F. below the melting point of said polymer.

2. The method of claim 1 wherein said polymer is prepared by the reaction of sodium sulfide with para-dichlorobenzene in N-methylpyrrolidone.

3. A method according to claim 2 wherein said sulfur-containing polymer and said melt flow modifier are dispersed in a dispersing medium which is a nonsolvent for said polymer and said melt flow modifier, the mixture is homogenized, said dispersing medium is removed, and said polymer and said melt flow modifier now homogeneously mixed, are heated to a temperature which is at least 25° F. below the melting point of said polymer for a time sufficient to effect a reduction in the melt flow of said polymer.

4. A method according to claim 3 wherein the temperature to which said mixture is heated is in the approximate range of 25° F. to 100° F. below the melting point of the polymer and the time during which said mixture is heated is in the approximate range of 3 to 6 hours.

5. A method according to claim 3 wherein said dispersing medium is methanol.

6. A method according to claim 1 wherein said polymer is selected from the group consisting of compounds which have the following formulas:

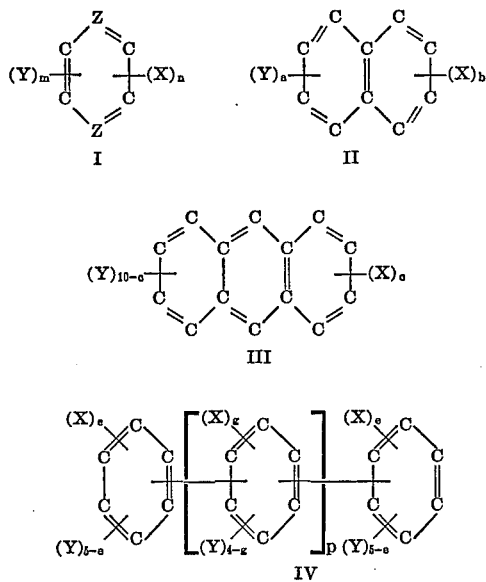

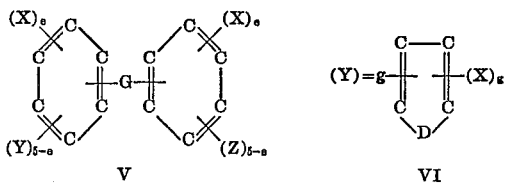

wherein each X is a halogen selected from the group consisting of chlorine, bromine, iodine, and fluorine, preferably chlorine and bromine, each Y is selected from the group consisting of hydrogen,

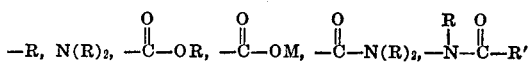

wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

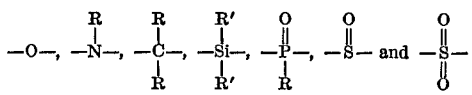

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

7. A method process according to claim 6 wherein the heating time is 1 to 24 hours.

8. A composition of matter formed by heating a mixture consisting essentially of
    (a) a polymer produced by the reaction of at least one polyhalo-substituted cyclic compound containing unsaturation between adjacent ring atoms and wherein the halogen atoms are attached to ring carbon atoms with an alkali metal sulfide in a polar organic solvent heated to a temperature for a time sufficient to form said polymer; and
    (b) an amount sufficient to reduce the melt flow of such polymer of a melt flow modifier selected from the group consisting of sulfur, at least one polythiuram polysulfide, or at least one organic peroxide, said heating being effected at a temperature in the range of from 25° F. to 100° F. below the melt point of such polymer.

9. A composition of matter according to claim 8 wherein the amount of said modifier is in the range of 2 to 10 parts of modifier per 100 parts of said polymer.

10. A composition of matter of claim 8 formed by heating poly(phenylene sulfide) prepared by the reaction of sodium sulfide with para-dichlorobenzene in N-methylpyrrolidone at an elevated temperature, and a small amount of melt flow modifier selected from the group consisting of sulfur, at least one polythiuram polysulfide, or at least one organic peroxide at a temperature of from 25° F. to 100° F. below the melting point of said poly(phenylene sulfide).

11. A composition of matter according to claim 8 wherein the said poly(phenylene sulfide) is homogeneously mixed with the melt flow modifier by forming a dispersion of said poly(phenylene sulfide), said melt flow modifier and methanol, agitating said dispersion, and removing said methanol.

12. A polymer according to claim 8 wherein said mixture of poly(phenylene sulfide) and melt flow modifier is heated at a temperature of from about 40° F. to 90° F. below the melting point of said poly(phenylene sulfide) for 1 hour to 24 hours.

13. A process for producing a molded polymer comprising heating at an elevated temperature in the range of 25° F. to 100° F. below the melt point of the polymer in a predetermined shaped mold, a homogeneous mixture consisting essentially of:
(a) a polymer formed by the reaction of at least one polyhalo-substituted cyclic compound containing unsaturation between adjacent ring atoms and wherein the halogen atoms are attached to ring carbon atoms with an alkali metal sulfide and a polar organic solvent at an elevated temperature for a time sufficient to form said polymer; and
(b) a melt flow reducing amount of a melt flow modifier selected from the group consisting of sulfur, at least one polysulfide, or at least one organic peroxide.

14. A process according to claim 1 wherein the amount of said melt flow modifier is in the range of about 2 to about 10 parts by weight per 100 parts by weight of sulfur-containing polymer.

References Cited
UNITED STATES PATENTS

| | | | |
|---|---|---|---|
| 3,458,486 | 7/1969 | Ray et al. | 260—79.1 |
| 3,562,199 | 2/1971 | Hill, Jr. et al. | 260—37 |
| 3,219,638 | 11/1965 | Warner | 260—79 |
| 3,523,985 | 8/1970 | Marrs | 260—882 |

DONALD E. CZAJA, Primary Examiner

M. I. MARQUIS, Assistant Examiner

U.S. Cl. X.R.

260—37 R, 41.5 R, 79.1; 264—331

UNITED STATES PATENT OFFICE
CERTIFICATE OF CORRECTION

Patent No. 3,699,087   Harold V. Wood et al   Dated: October 17, 1972

It is certified that error appears in the above-identified patent and that said Letters Patent are hereby corrected as shown below:

Column 10, lines 1-9, delete Formulas V and VI as there shown and insert the following correct formulas

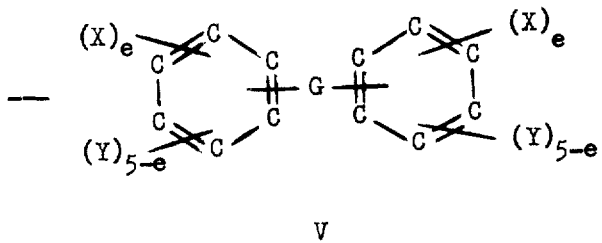

V

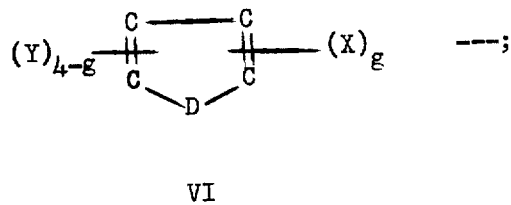

VI column 10, line 48, delete "process".

Signed and sealed this 6th day of March 1973.

(SEAL)
Attest:

EDWARD M. FLETCHER, JR.
Attesting Officer

ROBERT GOTTSCHALK
Commissioner of Patents